(12) United States Patent
Lin

(10) Patent No.: US 7,406,993 B2
(45) Date of Patent: Aug. 5, 2008

(54) GEAR ASSEMBLY OF LAMINATING APPARATUS

(75) Inventor: Shin-Fu Lin, Taipei (TW)

(73) Assignee: Transpacific Plasma LLC, Taipei (TW)

( * ) Notice: Subject to any disclaimer, the term of this patent is extended or adjusted under 35 U.S.C. 154(b) by 126 days.

(21) Appl. No.: 11/234,957

(22) Filed: Sep. 26, 2005

(65) Prior Publication Data

US 2006/0180276 A1 Aug. 17, 2006

(30) Foreign Application Priority Data

Oct. 1, 2004 (TW) .............................. 93129909 A

(51) Int. Cl.
*B32B 37/00* (2006.01)
(52) U.S. Cl. ....................................... 156/555; 156/582
(58) Field of Classification Search ................. 156/555, 156/580, 582, 583.1; 100/327, 160, 176
See application file for complete search history.

(56) References Cited

U.S. PATENT DOCUMENTS 4,302,276 A * 11/1981 Schulze ...................... 156/553
6,874,555 B1 * 4/2005 Hsiao .......................... 156/555

* cited by examiner

*Primary Examiner*—James Sells
(74) *Attorney, Agent, or Firm*—Workman Nydegger

(57) ABSTRACT

A gear assembly of a laminating apparatus includes a fixed gear device and an adjustable gear device connected between a motor and the fixed gear. The adjustable gear device includes a transmission shaft driven by the motor to rotate, a movable gear sleeved on and slidable along the axial direction of the transmission shaft, and an urging device coupled to the movable gear. The movable gear engages with a fixed gear in an object laminating mode but disengages from the fixed gear in an object releasing mode. For disengaging the movable gear from the fixed gear, an external force is exerted to force the movable gear to move toward and sustain against the urging device, and for restoring the engagement of the movable gear with the fixed gear, the external force is released to have the urging device push the moveable gear back to the engaging position.

15 Claims, 4 Drawing Sheets

GEAR ASSEMBLY OF LAMINATING APPARATUS

FIELD OF THE INVENTION

The present invention relates to a gear assembly, and more particularly to a gear assembly of a laminating apparatus. The present invention also relates to a laminating apparatus having an adjustable gear device for switching the laminating apparatus between an object laminating mode and an object releasing mode.

BACKGROUND OF THE INVENTION

As protecting precious documents/photos is getting more and more important, a laminating apparatus for providing protective films onto the documents/photos has been widely used not only in office or but also in home. A conventional laminating apparatus is shown in FIG. 1 that principally comprises feeding and heating rollers 10 for feeding a sheet material and upper and lower plastic films while laminating them together with heat. The rollers 10 are driven by a motor 11 through a gear assembly 12 to feed the object through a laminating passage therebetween. The gear assembly 12 includes three gears, two of which are coupled to the rollers 10, respectively, and the other one of which is coupled to the motor 11 for transmitting the rollers 10 to rotate through the aforementioned two gears.

Conventionally, these gears of the gear assembly 12 engage firmly with one another all the time. Therefore, when the laminated sheet material is jammed in the laminating passage, it is hard to be removed. In order to overcome this problem, a laminating apparatus equipped with an object releasing mechanism was suggested by a Taiwanese patent publication number 302824, which is incorporated herein for reference. In this laminating apparatus, a bulky pivoting mechanism is provided and a frame of the pivoting mechanism has to be pivoted to transmit one of the gears to disengage from another gear so as to release the jammed object. The extra elements of the pivoting mechanism increase cost greatly. Further, as the gear to be disengaged is coupled to a motor, the weighty motor need be pivoted along with the gear and the frame. Therefore, the transmitting structure is complicated for assembling and maintenance.

SUMMARY OF THE INVENTION

Therefore, the present invention provides a gear assembly involving a simplified transmitting structure while allowing a jammed object to be removed easily.

The present invention also provides a laminating apparatus having an adjustable gear device for switching the laminating apparatus between an object laminating mode and an object releasing mode in an easily operating manner.

A gear assembly of a laminating apparatus, driven by a motor to transmit a roller to rotate so as to feed an object through a laminating passage to be laminated. The gear assembly comprises a transmission shaft coupled to and driven by the motor to rotate; a movable gear sleeved on and rotating with the transmission shaft and slidable along the axial direction of the transmission shaft between an object laminating position and an object releasing position; and a fixed gear coupled to the roller, engaging and rotating with the movable gear at the object laminating position for feeding the object through the roller, and disengaging from the movable gear at the object releasing position for releasing the object from the roller.

In an embodiment, the gear assembly further comprises a push device for exerting thereon an external force to push the moveable gear from the object laminating position to the object releasing position.

In an embodiment, the gear assembly further comprises an urging device coupled to the movable gear, urged by the movable gear when the movable gear is moved to the object releasing position by the push device in response to the external force, and pushing the moveable gear back to the object laminating position when the external force is released from the push device.

In an embodiment, the urging device includes an elastic element in contact with the movable gear for providing a restoring force when the elastic element is compressed by the movable gear, thereby moving the movable gear back to the object laminating position. For example, the urging device is a coil spring sleeved around the transmission shaft and disposed at a side of the movable gear.

In an embodiment, the push device comprises a push element arranging therein a guiding track and having a sustaining slant portion with a maximum thickness greater than a clearance of a gap between the movable gear at the object laminating position and a supporting plate at a side of the movable gear opposite to the urging device; and a sliding member protruding from the supporting plate and slidable relative to the guiding track for inserting the sustaining slant portion into the gap so as to push the movable gear toward the object releasing position while urging against the urging device. Preferably, the push device further comprises a lock for keeping the sustaining slant portion inside the gap, thereby securing the movable gear at the object releasing position. The lock can be a branched track laterally extending from the guiding track for retaining the sliding member therein.

In an embodiment, the external force is exerted on the push element to slide the guiding track through the sliding member and engaging the branched track with the sliding member, and the moveable gear is pushed back to the object laminating position by the urging device when the external force is released from the push element and another external force is exerted to disengage the branched track from the sliding member.

In an embodiment, an arched indentation is formed in the front of the sustaining slant portion for bypassing the transmission shaft when the sustaining slant portion enters the gap to a certain extent.

In another embodiment, the push device comprises a fulcrum structure protruding from a supporting plate that is disposed at a side of the movable gear opposite to the urging device; and a push rod having a first end extending into a gap between the movable gear and the supporting plate and performing a levering operation via the fulcrum structure by exerting the external force on a second end thereof opposite to the first end, thereby pushing the movable gear toward the object releasing position while urging against the urging device. Preferably, the push device further comprises a compression spring connected between the supporting plate and the push rod and depressed by the push rod in response to the levering operation, and the compression spring pushes the second end of the push rod back so as to release the first end of the push rod from the movable gear when the external force is released from the second end of the push rod, thereby the urging device pushing the movable gear back to the object laminating position. More preferably, the push device further includes a lock for maintaining the levering operation, thereby securing the movable gear at the object releasing position. For example, the lock includes a recess in the push rod at the second end and a post protruding from the supporting plate, and the recess is a distance away from the post when the movable gear is at the object laminating position and engageable with the recess when the movable gear is at the object releasing position.

The present invention also relates to a laminating apparatus, which comprises a pair of rollers for feeding an object through a laminating passage therebetween while laminating the object with laminating films in the laminating passage; a pair of fixed gears coupled to the pair of rollers for rotating the rollers therewith, respectively, thereby feeding the object; a motor for providing a driving force; a transmission shaft rotating in response to the driving force; and a movable gear coupled to and rotating with the transmission shaft, engaging with and transmitting the pair of fixed gears to rotate in an object laminating mode, and disengaging from the fixed gears in an object releasing mode by moving along the axial direction of the transmission shaft.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
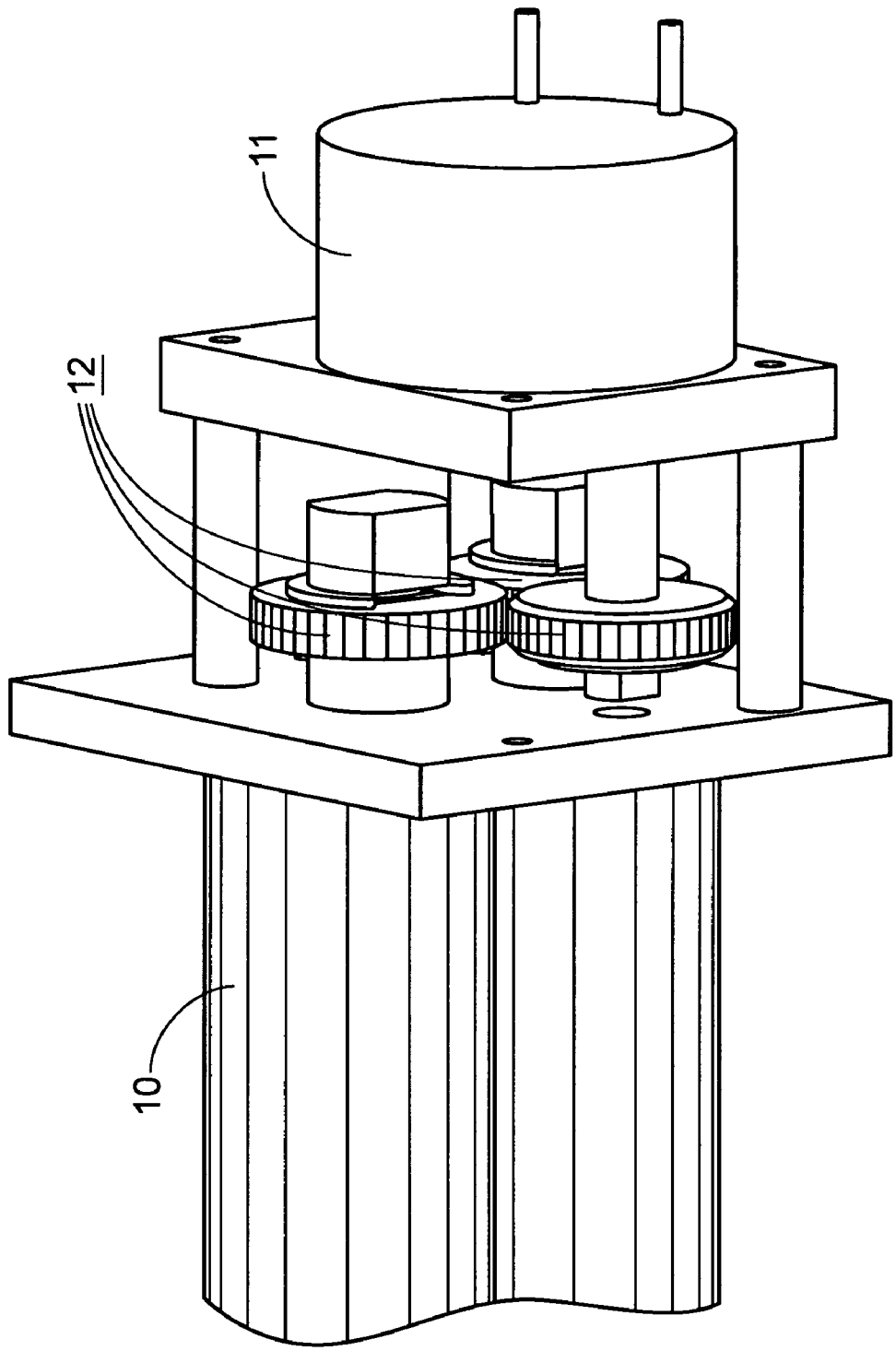
FIG. 1 is a partial perspective view of a conventional laminating apparatus.
Figure 2:
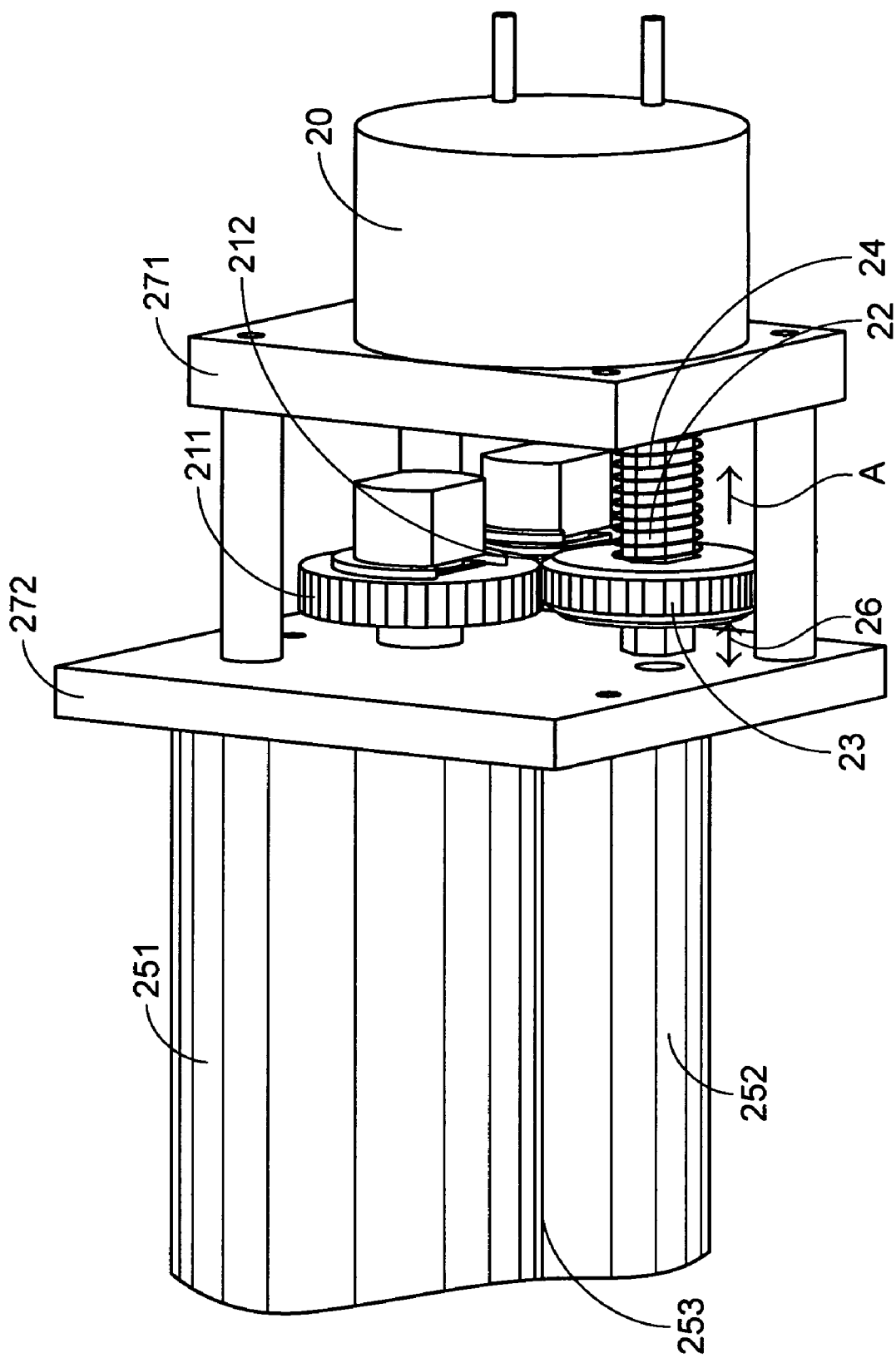
FIG. 2 is a partial perspective view illustrating a first embodiment of a laminating apparatus according to the present invention.

As known, once object jam occurs and the motor stops working, the rollers will not rotate and are also hard to be rotated because their corresponding gears are tightly clamped with the motor gear at the engaging position. The removal of the jammed object is difficult. Therefore, it is preferred that a laminating apparatus can be switched between an object laminating mode, in which an object can be smoothly fed into a laminating passage to be laminated with protective films, and an object releasing mode, in which the jammed object can be removed smoothly. FIG. 2 illustrates a part of a laminating apparatus having an adjustable gear device of the present invention. The laminating apparatus as shown includes a motor 20, rollers 251 and 252, and a gear assembly consisting of two fixed gears 211 and 212 and a movable gear 23. The fixed gears 211 and 212 are coupled to two shafts of the rollers 251 and 252, respectively, and engage with each other for transmitting the rollers to rotate simultaneously and oppositely. The movable gear 23 is coupled to and driven by the motor 20 through a transmission shaft 22 by sleeving around the transmission shaft. The movable gear 23 directly engages with one of the fixed gears 211 and 212, which is referred to as an object laminating position, when the laminating apparatus is in the object laminating mode, and disengages from the fixed gears 211 and 212, which is referred to as an object releasing position, when the laminating apparatus is in the object releasing mode.

In the object laminating mode, the movable gear 23 transmits the fixed gears 211 and 212 directly and indirectly engaging therewith to rotate in response to a driving force of the motor 20, thereby rotating the rollers 251 and 252. The rotation of the rollers 251 and 252 transmits the object passing through the laminating passage 253 therebetween to be heated and pressed. On the other hand, in the object releasing mode, the movable gear 23 disengages from the fixed gears 211 and 212. Therefore, the fixed gears 211 and 212 and thus the rollers 251 and 252 are released to allow the object jammed in the passage 253 to be removed smoothly.

According to the present invention, the movable gear 23 is slidable on the transmission shaft 22 so as to move between the object laminating position and the object releasing mode. In the embodiment of FIG. 2, the sliding action of the movable gear 23 can be enabled with an external force directly exerted thereon. An urging device 24, e.g. a coil compression spring sleeved on the transmission shaft 22, is preferably arranged beside the movable gear 23, i.e. between the movable gear 23 and a supporting plate 271, to retain the moveable gear 23 in the engaging position. Being moved along the axial direction of the transmission shaft 22, as indicated by the arrow A, the movable gear 23 disengages from the fixed gears 211 and 212 while compressing the urging device 24. Meanwhile, the urging device 24 provides a restoring force to push the movable gear 23 back to the engaging state with the fixed gears 211 and 212 when the external force is released after the jammed object has been removed.

In addition to circular shapes, both the cross sections of the transmission shaft 22 and the central through hole of the moveable gear 23 can also be hexangular or polygonal in other way to facilitate the rotation of the moveable gear 23 with the transmission shaft 22 while still allowing the movable gear 23 to slide on the transmission shaft 22.

Figure 3:
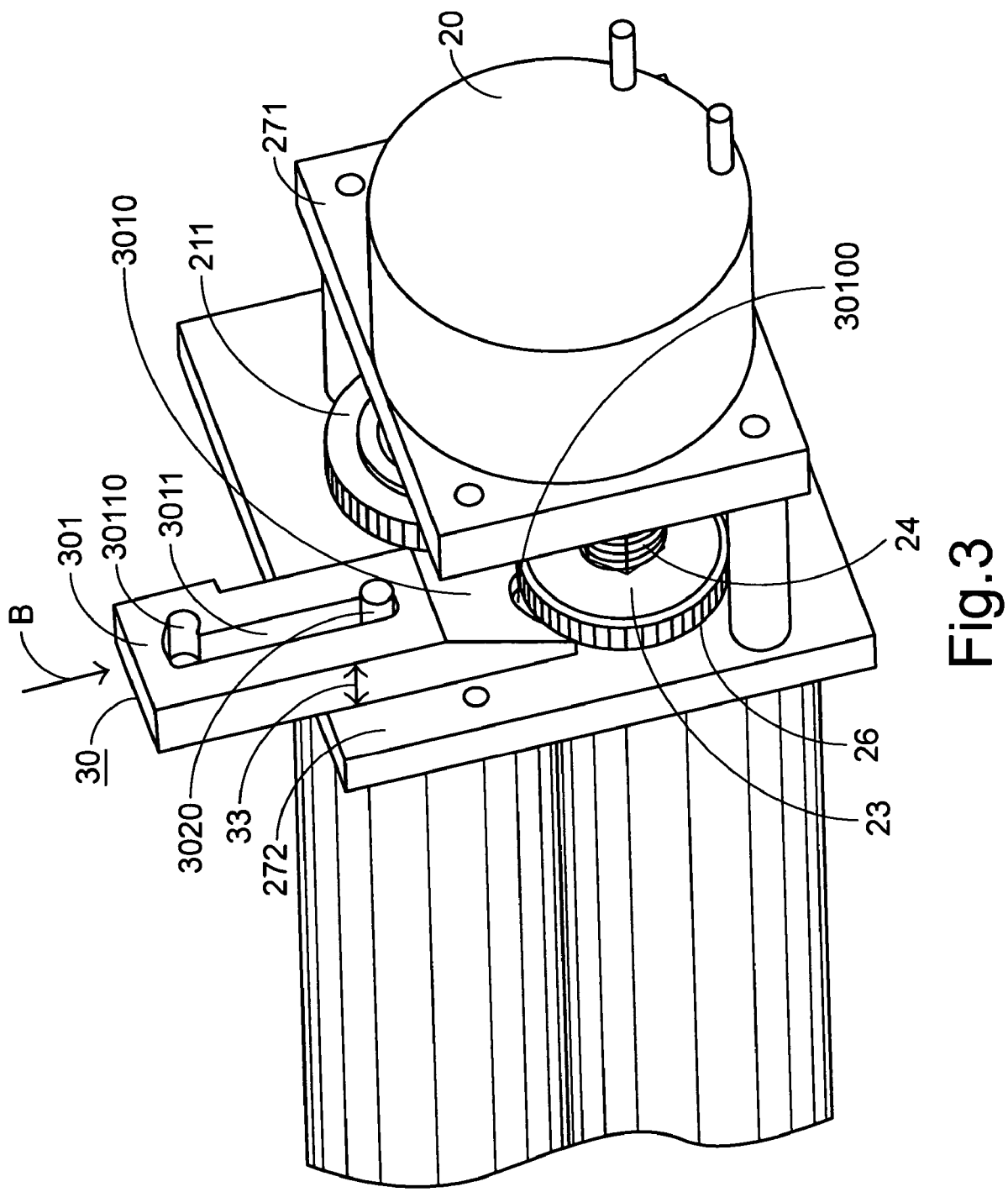
FIG. 3 is a partial perspective view illustrating a second embodiment of a laminating apparatus according to the present invention.

Instead of directly sliding the movable gear 23 on the transmission shaft 22 with the user's hand, a push device 30 can be used in another embodiment as an auxiliary tool to slide the movable gear 23, as shown in FIG. 3. The push device 30 includes a push element 301 and a sliding member 3020. The push element 301 has a guiding track 3011, e.g. a slot, and a sustaining slant portion 3010 with a maximum thickness 33 greater than the clearance of a gap 26 (see also FIG. 2) between the movable gear 23 at the object laminating position and a supporting plate 272. The sliding member 3020 protrudes from the supporting plate 272. When the user pushes the push element 301 down, as indicated by the arrow B, the guiding slot 3011 slides through the sliding member 3020 so as to insert the sustaining slant portion 3010 into the gap 26 so as to push the movable gear away from the engaging position. When the entire sustaining slant portion 3010 enters the gap 26, the movable gear 23 will be pushed to the object releasing position while urging against the urging device 24. For assuring the sufficient working distance of the sustaining slant portion 3010 into the gap 26, an arched indentation 30100 conforming to the circumference of the transmission shaft 22 is formed in the front of the inclined plane 3010 for bypassing the transmission shaft 22. Preferably, a branched track 30110, e.g. a recess, laterally extending from the guiding track 3011 is used as a lock for keeping the sustaining slant portion 3010 inside the gap 26. By moving the sliding member 3020 into the recess 30110, the movable gear 23 can be secured at the object releasing position. In this way, the user can spare both of his hands for the removal of the jammed object. Afterwards, once the user releases the push element 301 from the gap 26 by exerting a contrary external force to have the sliding member 3020 move out of the recess 30110 and back to the original position as currently shown in FIG. 3, the restoring force provided by the compression spring 24 will force the movable gear 23 back to the engaging position again. It would be understood that the sliding member 3020 and guiding track 3011 may be replaced by any other suitable mechanism which can perform similar function.

Figure 4:
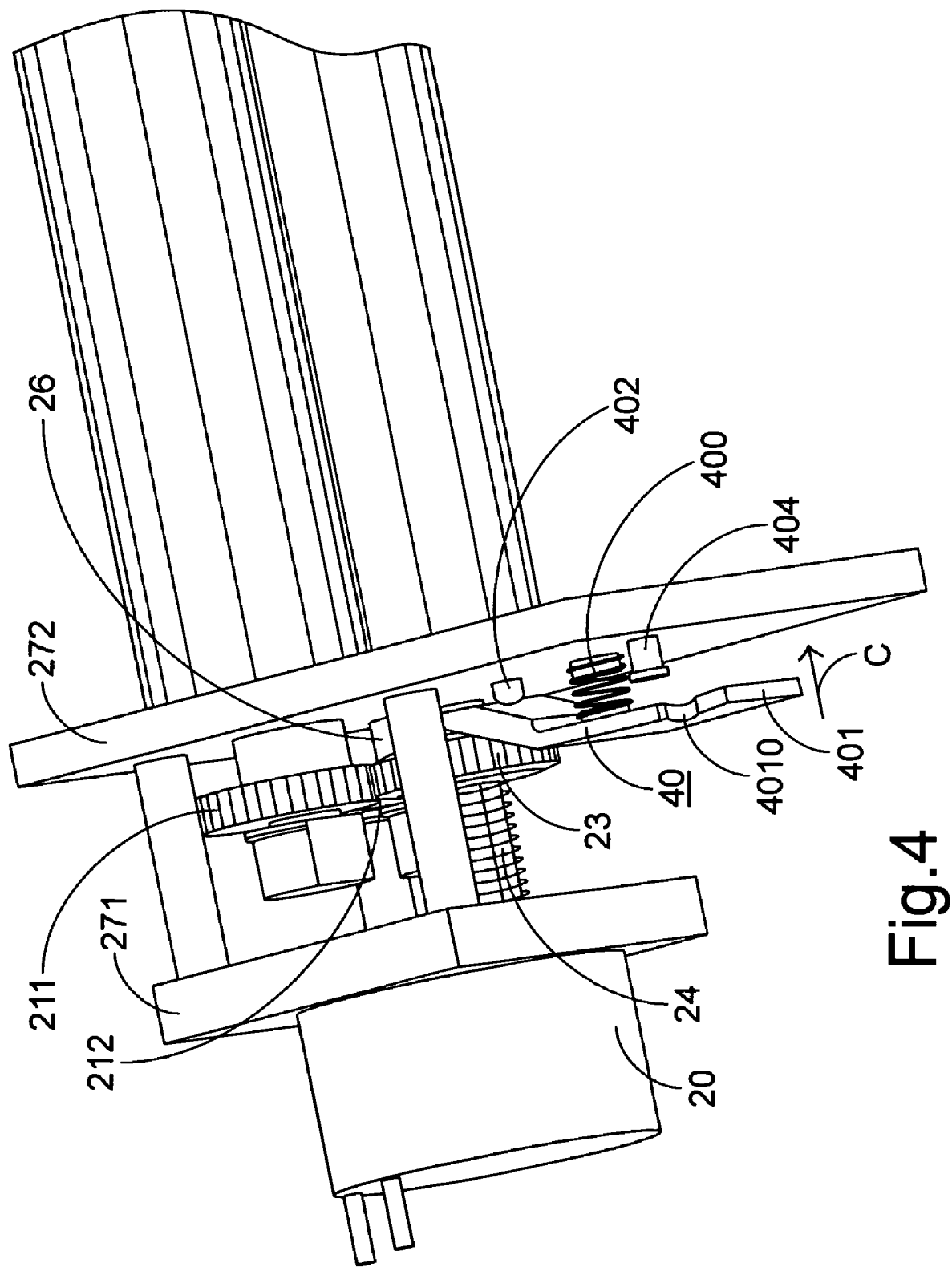
FIG. 4 is a partial perspective view illustrating a third embodiment of a laminating apparatus according to the present invention.

In another embodiment, the push device can be a lever configuration, as shown in FIG. 4. The push device 40 includes a push rod 401, an urging device 400, e.g. a compression spring, and a fulcrum structure 402. The push rod 401 extends into the gap 26 between the movable gear 23 and the supporting plate 272 by one end and suspends over the compression spring 400 by the other end. The fulcrum structure 402 protrudes from the supporting plate 272 and located under a middle portion of the push rod 401. The compression spring 400 connected between the push rod 401 and the supporting plate 272. For disengaging the movable gear 23 from the fixed gears 211 and 212, a levering operation is performed via the fulcrum structure 402 by exerting a pressing force on the suspending end of the push rod 401, as indicated by the arrow C, thereby pushing the movable gear 23 toward the object releasing position while urging against the urging device 24. Meanwhile, the compression spring 400 is depressed by the push rod 401 in response to the levering operation. The push device 40 preferably includes a lock for maintaining the levering operation, thereby securing the movable gear 23 at the object releasing position. For example, the lock includes a recess 4010 formed in the push rod 401 at the suspending end and a post 404 protruding from the supporting plate 272. When the movable gear 23 is at the engaging position, or object laminating position, the recess 4010 is a distance away from the post, as currently shown in FIG. 4. On the other hand, once the movable gear 23 is pushed to the object releasing position, the movable gear 23 becomes engageable with the recess 4010. In this way, the user can spare both of his hands for the removal of the jammed object. Afterwards, by disengaging the post 404 from the recess 4010, the compression spring 400 will raise the push rod 401 up so as to release the previous levering operation. Accordingly, the push rod 401 can be released from the movable gear 23 so that the compression spring 24 can push the movable gear 23 back to the object laminating position.

It is understood from the above description that the gear assembly of the present invention allows the laminating apparatus to be switched between an object laminating position and an object releasing position by simply sliding a gear in the axial direction of the cooperative transmission shaft so as to disengage the feeding rollers from the weighty motor, thereby facilitating the removal of the jammed object. Therefore, little material cost and assembling laboring is concerned.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A gear assembly of a laminating apparatus, comprising:
a transmission shaft coupled to a motor;
a movable gear adapted to rotate with said transmission shaft, wherein the moveable gear is adapted to slide along an axial direction of said transmission shaft between an object laminating position and an object releasing position;
a fixed gear coupled to a roller, wherein the fixed gear is capable of engaging and rotating with said movable gear if said movable gear is at said object laminating position, and wherein the fixed gear is capable of disengaging from said movable gear if said movable gear is at said object releasing position;
a push device capable of receiving an external force to slide said movable gear from said object laminating position to said object releasing position; and
an urging device coupled to said movable gear, wherein the urging device is capable of pushing said movable gear back to said object laminating position in response to said external force being released from said push device;
wherein said urging device comprises an elastic element capable of being in contact with said movable gear and capable of providing a restoring force if said elastic element is compressed by said movable gear; and
wherein said urging device comprises a coil spring sleeved around said transmission shaft and disposed at a side of said movable gear.

2. A gear assembly of a laminating apparatus, comprising:
a transmission shaft coupled to a motor;
a movable gear adapted to rotate with said transmission shaft, wherein the moveable gear is adapted to slide along an axial direction of said transmission shaft between an object laminating position and an object releasing position;
a fixed gear coupled to a roller, wherein the fixed gear is capable of engaging and rotating with said movable gear if said movable gear is at said object laminating position, and wherein the fixed gear is capable of disengaging from said movable gear if said movable gear is at said object releasing position;
a push device capable of receiving an external force to slide said movable gear from said object laminating position to said object releasing position; and
an urging device coupled to said movable gear, wherein the urging device is capable of pushing said movable gear back to said object laminating position in response to said external force being released from said push device
wherein said push device comprises
a push element comprising a guiding track having a sustaining slant portion with a maximum thickness greater than a clearance of a gap between said movable gear at said object laminating position and a supporting plate at a side of said movable gear opposite to said urging device; and
a sliding member protruding from said supporting plate and slidable relative to said guiding track for inserting said sustaining slant portion into said gap so as to push said movable gear toward said object releasing position while urging against said urging device.

3. The gear assembly according to claim 2 wherein said push device further comprises a lock capable of keeping said sustaining slant portion inside said gap to secure said movable gear at said object releasing position.

4. The gear assembly according to claim 3 wherein said lock comprises a branched track laterally extending from said guiding track capable of retaining said sliding member therein.

5. The gear assembly according to claim 4 wherein said guiding track is capable of sliding through said sliding member and engaging said branched track with said sliding member in response to an exertion of the external force on the push element, and wherein said movable gear is pushed back to said object laminating position by said urging device if said external force is released from said push element and if another external force is exerted to disengage said branched track from said sliding member.

6. The gear assembly according to claim 5 further comprising an arched indentation formed in the front of said sustaining slant portion capable of bypassing said transmission shaft if said sustaining slant portion substantially enters said gap.

7. The gear assembly according to claim 1 wherein said push device comprises:
   a fulcrum structure protruding from a supporting plate that is disposed at a side of said movable gear opposite to said urging device; and
   a push rod having a first end extending into a gap between said movable gear and said supporting plate and capable of performing a levering operation via said fulcrum structure by exerting said external force on a second end thereof opposite to said first end, thereby pushing said movable gear toward said object releasing position while urging against said urging device.

8. The gear assembly according to claim 7 wherein said push device further comprises a compression spring connected between said supporting plate and said push rod and capable of being depressed by said push rod in response to said levering operation, and said compression spring is capable of pushing said second end of said push rod back so as to release said first end of said push rod from said movable gear if said external force is released from said second end of said push rod, thereby causing said urging device to push said movable gear back to said object laminating position.

9. The gear assembly according to claim 7 wherein said push device further includes a lock for maintaining said levering operation, thereby securing said movable gear at said object releasing position.

10. The gear assembly according to claim 9 wherein said lock comprises a recess in said push rod at said second end and a post protruding from said supporting plate, wherein said recess is positioned a distance away from said post if said movable gear is at said object laminating position, and wherein said post is capable of engaging with said recess if said movable gear is at said object releasing position.

11. A laminating apparatus, comprising:
   a pair of rollers for feeding an object through a laminating passage;
   a pair of fixed gears coupled to said pair of rollers capable of rotating said rollers;
   a motor capable of providing a driving force;
   a transmission shaft capable of rotating in response to said driving force;
   a movable gear coupled to and capable of rotating with said transmission shaft, capable of engaging with and causing said pair of fixed gears to rotate in an object laminating mode, and capable of disengaging from said pair of fixed gears in an object releasing mode by moving along the axial direction of said transmission shaft;
   a supporting plate disposed between said pair of rollers and said fixed and movable gears;
   a push element comprising a guiding track and having a sustaining slant portion with a maximum thickness greater than a clearance of a gap between said movable gear and said supporting plate; and
   a sliding member protruding from said supporting plate and capable of sliding relative to said guiding track to insert said sustaining slant portion into said gap so as to push said movable gear to disengage from said pair of fixed gears.

12. The laminating apparatus according to claim 11 further comprising an urging device coupled to said movable gear capable of being urged by said movable gear if said movable gear is pushed by said sustaining slant portion to disengage from said a pair of fixed gears, and capable of pushing said movable gear back to engage with said pair of fixed gears if said sustaining slant portion is removed from said gap.

13. The laminating apparatus according to claim 11, further comprising:
   a supporting plate disposed between said pair of rollers and said fixed and movable gears;
   a fulcrum structure protruding from said supporting plate; and
   a push rod having a first end extending into a gap between said movable gear and said supporting plate, and capable of performing a levering operation via said fulcrum structure to push said movable gear with said first end thereof by exerting an external force on a second end thereof so as to disengage said movable gear from said pair of fixed gears.

14. The laminated apparatus according to claim 13 further comprising an urging device coupled to said movable gear at a side opposite to said supporting plate, said urging device capable of being urged by said movable gear when said movable gear disengages from said pair of fixed gears in response to said levering operation, and capable of pushing said movable gear back to engage with said pair of fixed gears in response to the suspension of said levering operation.

15. The laminating apparatus according to claim 11 further comprising an urging device sleeved around said transmission shaft and disposed adjacent to said movable gear, said urging device capable of being urged by said movable gear if said movable gear disengages from said pair of fixed gears in said object releasing mode, and capable of pushing said movable gear back to engage with said pair of fixed gears in said object laminating mode.

* * * * *

UNITED STATES PATENT AND TRADEMARK OFFICE
CERTIFICATE OF CORRECTION

PATENT NO. : 7,406,993 B2
APPLICATION NO. : 11/234957
DATED : August 5, 2008
INVENTOR(S) : Lin Page 1 of 1

It is certified that error appears in the above-identified patent and that said Letters Patent is hereby corrected as shown below:

In Column 8, line 18, remove "a" after "said"

In Column 8, line 34, delete "laminated" and insert --laminating--

Signed and Sealed this

First Day of September, 2009

David J. Kappos
*Director of the United States Patent and Trademark Office*